Figure 1:
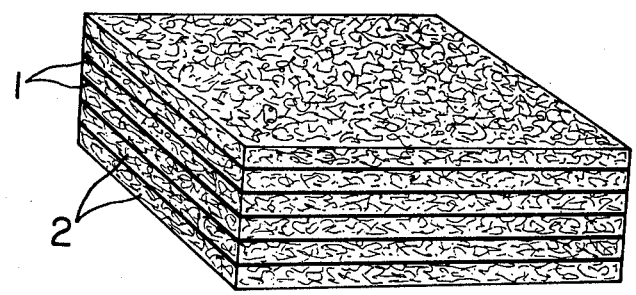

United States Patent [19]

Awano et al.

[11] 4,284,680
[45] Aug. 18, 1981

[54] MULTI-LAYERED, NEEDLE PUNCHED, FELT-LIKE CUSHIONING MATERIAL AND PRODUCTION METHOD THEREOF

[75] Inventors: Shunya Awano, Matsudo; Akio Shittaka, Narashino, both of Japan

[73] Assignee: Ichikawa Woolen Textile Co., Ltd., Tokyo, Japan

[21] Appl. No.: 115,673

[22] Filed: Jan. 28, 1980

[30] Foreign Application Priority Data

Jan. 30, 1979 [JP] Japan .................................. 54/8758

[51] Int. Cl.³ .............................................. B32B 5/02
[52] U.S. Cl. ..................................... 428/234; 28/103; 28/107; 28/112; 428/246; 428/252; 428/280; 428/282; 428/284; 428/287; 428/300
[58] Field of Search ......................... 28/103, 107, 112; 428/109, 110, 234, 238, 239, 246, 252, 280, 282, 284, 287, 298, 299, 300

[56] References Cited

U.S. PATENT DOCUMENTS

| | | |
|---|---|---|
| 3,166,823 | 1/1965 | Bernard . |
| 3,570,085 | 3/1971 | Heinemann ............................ 28/112 |
| 3,856,602 | 12/1974 | Colyn et al. ........................... 28/112 |
| 3,952,121 | 4/1976 | Dilo ...................................... 428/300 |
| 3,994,759 | 11/1976 | Stotler ................................... 28/112 |
| 4,113,535 | 9/1978 | Lefkowitz et al. ................... 428/234 |
| 4,199,635 | 4/1980 | Parker .................................. 28/112 |
| 4,205,113 | 5/1980 | Hermannson ......................... 28/112 |

FOREIGN PATENT DOCUMENTS

| | | |
|---|---|---|
| 53-26386 | 3/1978 | Japan . |
| 939933 | 10/1963 | United Kingdom . |
| 1079395 | 8/1967 | United Kingdom . |
| 1337442 | 11/1973 | United Kingdom . |
| 1377037 | 12/1974 | United Kingdom . |

Primary Examiner—James J. Bell
Attorney, Agent, or Firm—George A. Loud

[57] ABSTRACT

The specification describes a multi-layered, needle-punched, felt-like cushioning material for a hot-pressing machine. The cushioning material is made of at least two fibrous batts and at least one foundation fabric interposed between the batts and needle-punched with the batts. The specification also describes a method for producing the above cushioning material. The cushioning materials according to this invention have a high density and can maintain high elasticity and excellent cushioning properties over a relatively long period of hot-pressing operation.

5 Claims, 2 Drawing Figures

MULTI-LAYERED, NEEDLE PUNCHED, FELT-LIKE CUSHIONING MATERIAL AND PRODUCTION METHOD THEREOF

The present invention relates to a cushioning material adapted for a hot-pressing machine which is employed to produce decorated boards, laminated boards, plywoods, and the like. More particularly, this invention relates to a cushioning material which is adapted for the same purpose as described above and which comprises a multi-layered, needle-punched felt and has a high density and exhibits high elasticity.

When decorated boards, laminated boards, plywoods or similar items are produced by a hot-pressing machine, a cushioning material is interposed between a heating plate and its respective mold plate to rectify any unevenness of the heating plate as well as to exert uniform pressure onto the respective surfaces of the hot-pressed item.

Among such cushioning materials, the conventionally used material is a needle-punched felt which may optionally be impregnated with rubber or resin. Such a conventional needle-punched felt is made of a single layer of fibrous batt or a combination of a foundation fabric and a fibrous batt, and is considered to be insufficient in terms of density and elasticity. Such a conventional needle-punched felt can hardly retain its initial thickness and is susceptible of being deformed and eventually loses its elasticity, under hot-pressing conditions of high temperature and pressure (for example, 120°–250° C.; 5–200 kg/cm$^2$). If such a conventional needle-punched felt is impregnated with rubber or resin, such an impregnated felt loses its cushioning nature as rubber or resin is inferior to fibrous materials in terms of heat resistant properties and is deteriorated and modified in the initial stage of its use.

The present invention has been completed to solve such drawbacks of prior art cushioning materials.

In one aspect of this invention, there is provided a method for producing a multi-layered, needle-punched, felt-like cushioning material which contains at least two fibrous batts and at least one foundation fabric interposed between the batts and needle-punched therewith. The method comprises needle-punching the batts and fabric to cause the fibers of the batts and fabric to tangle together and to form a united body. Then, the united body is subjected to a heat treatment to heat-set the fibers of the batts and fabric.

In another aspect of this invention, there is provided a method for producing a multi-layered, needle-punched, felt-like cushioning material containing a plurality of fibrous batts and a plurality of foundation fabrics alternately juxtaposed and needle-punched with said fibrous batts. According to the method, a web of the fibrous batts and a sheet of the foundation fabrics are fed in a juxtaposed fashion. The web and sheet are needle-punched while travelling in a circle. The thus needle-punched web and sheet are allowed to advance together with the trailing unneedle-punched web and sheet in a juxtaposed fashion. The above procedure is repeated until a multi-layered circular felt containing predetermined layers of fibrous batts and foundation fabrics are obtained. The circular felt is subjected to a heat treatment to set the fibers of the batts and fabrics. Thereafter, the circular felt is severed open to form the cushioning material. Where it is desired to form a plurality of the fibrous batts on each of the upper and lower surfaces of the cushioning material, a fibrous web is allowed to travel on the outer surface of the multi-layered circular felt. The fibrous web and circular felt are needle-punched, and then allowed to advance in the circle together with the trailing unneedle-punched web juxtaposed thereon. This procedure is repeated until predetermined layers of the fibrous batts are formed on the outer surface of the multi-layered circular felt. The outer and inner surfaces of the multi-layered circular felt are reversed and the above procedure is repeated.

In still another aspect of this invention, there is provided a multi-layered, needle-punched, felt-like cushioning material which comprises at least two fibrous batts and at least one foundation fabric interposed between the above batts and needle-punched therewith.

In a further aspect of this invention, there is provided a multi-layered, needle-punched, felt-like cushioning material which comprises a plurality of fibrous batts and a plurality of foundation fabrics alternately juxtaposed and needle-punched with the above fibrous batts. A plurality of fibrous batts may be juxtaposed on and needle-punched with each of the upper and lower surfaces of such a cushioning material.

Figure 2:
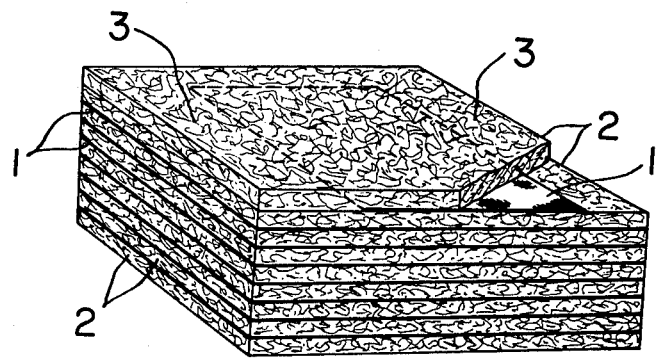

A cushioning material according to the present invention is, as shown in FIGS. 1 and 2, formed into a multi-layered structure by alternately juxtaposing a plurality of foundation fabrics 1 and fibrous batts 2, rendering the thus-juxtaposed foundation fabrics 1 and fibrous batts 2 into a united body by needle-punching the same, and then subjecting the thus-united body to a heat treatment. The cushioning material has a high density and exhibits high elasticity and excellent cushioning properties.

Among fabrics employable as the foundation fabrics 1, there are coarsely-woven fabrics and mesh fabrics. It is also possible to use, as the foundation fabrics 1, a bonded fabric which is produced by alternately juxtaposing a plurality of warp and weft yarns and then adhering the weft and warp yarns together at the crosspoints thereof. Such weft and warp yarns do not involve any folded or bent portions and accordingly, when a plurality of such foundation fabrics is used in a juxtaposed fashion or in an alternately juxtaposed fashion with fibrous batts, it increases the density of resulting cushioning materials and improves anti-bending, compression resistant, dimensional stability and cushioning properties without substantially increasing the thicknesses thereof.

The foundation fabrics 1 and fibrous batts 2 may be made of polyamide, polyester and/or polyacrylic fibers in entirety or a small amount of natural fibers may be incorporated therein. Where high heat-resistant properties are required, they may preferably be made of an aromatic polyamide, for example, polymethaphenylene isophthalamide or polyparaphenylene tetraphthalamide fibers in their entireties, or fluorine-contained resinous fibers, glass fibers, metal fibers, and/or carbon fibers may optionally be added thereto.

When metal fibers such as stainless steel fibers are mixed with fibers of such a synthetic resin as described above, the thermal conductivity of resulting cushioning materials is increased. Inclusion of such metal fibers and/or carbon fibers can prevent buildup of static electricity which tends to occur during hot-pressing operation. Where particularly high cushioning properties are required, it is desirable to make the felt with heat-shrinkable synthetic fibers which are entirely or principally made of one or more of the above-described synthetic resins and aromatic polyamides and then to subject the thus-made felt to a heat treatment at the temperature of shrinkage of a respective resin or temperatures higher than the temperature of shrinkage, thereby providing felt of a high density and high elasticity.

Generally speaking, the heating plates of a hot-pressing machine tend to apply pressure unevenly. They tend to exert higher pressure at peripheral portions thereof, particularly, at both end portions thereof. Therefore, as shown in FIG. 2, it is desirous to reduce the density and basis weight of a cushioning material at both end portions 3, 3 prior to hot-pressing, compared with the central portion thereof (in general, the density of each of the end portions is preferably 5 to 20% smaller than that of the central portion). For this purpose, the present invention makes, in one aspect thereof, the use of the fact that a cushioning material according to this invention has a multi-layered structure. In other words, upon juxtaposing a plurality of foundation fabrics 1 and fibrous batts 2 alternately, a lesser number of foundation fabrics 1 and/or fibrous batts 2 are used at both end portions. The thickness of one or more of the fibrous batts 2 may be reduced at both end portions. One or more of the fibrous batts 2 may be less packed at both end portions thereof. Alternatively, one or more of the fibrous batts 2 may be cut thinner at both end portions thereof.

For alternately juxtaposing a plurality of such foundation fabrics 1 and fibrous batts 2 and needle-punching the same by a needle-punching machine, a fibrous web and a sheet of the foundation fabric may be fed in a juxtaposed fashion. They are needle-punched together to form a united body while advancing. The thus-united body is then allowed to travel in a circle and meet the fibrous web and the sheet of the foundation fabric. Then, they continue to move forward and are needle-punched. This procedure is repeated until a predetermined thickness is achieved. In this respect, reference is made for example to John Ford British Pat. No. 1079395 published Aug. 16, 1967. Alternatively, a predetermined number of fibrous webs and the foundation fabrics may be fed in an alternately juxtaposed fashion. Then, they are needle-punched while travelling forward. This method allows a semi-continuous production of multi-layered cushioning materials. The needle-punching operation is preferably carried out intensely and strongly to firmly interconnect or tangle the fibers per se of the batts as well as the fibers of the batts and the foundation fabrics. The heat treatment step may be conducted at a temperature in the range of 200° to 300° C. by heating the cushioning material with hot air or thermally pressing the same while stretching the cushioning material to heat-set the fibers constituting the cushioning material. By such a heat treatment, the heat-shrinkable fibers shrink and are simultaneously heat-set, thereby stabilizing the dimensions, such as thickness, of the cushioning material as well as its properties as felt. The thus-treated cushioning materials have a basis weight of 250 g/m²–5,000 g/m² and a high apparent density ranging from 0.25 g/cm³ to 0.50 g/cm³ and exhibit high elasticity.

The thus-obtained cushioning material according to this invention has a structure of a united body formed by needle-punching multi-layered fibrous batts and foundation fabrics. Thus, they have a high density and elasticity and exhibit excellent cushioning properties. They develop little dimensional variations and maintain a rather uniform thickness during the use thereof under hot-pressing conditions of high temperature and pressure. They are not deteriorated by heat. Accordingly, they can be employed for a long, continuous use, thereby resulting in an improvement to the efficiency of a hot-pressing operation as well as to the quality of hot-pressed products.

In practice, it is desirable to sandwich with one or more layers of fibrous batts a cushioning material according to this invention. Such additional fibrous batts are needle-punched to the cushioning material. The thus-needled upper and lower fibrous batts minimize the effect of foundation fabrics which are considered to be less uniform compared with the fibrous batts.

The present invention is now described in more detail in conjunction with the appended drawings, in which:

FIG. 1 is a perspective view of a cushioning material according to one embodiment of the present invention; and FIG. 2 is a perspective view of a cushioning material according to another embodiment of this invention, in which a portion of the cushioning material is removed to show a sheet of shorter foundation fabric.

EXAMPLE 1

Each of the weft and warp yarns of foundation fabrics 1 was formed by twisting two strings of spun yarns, each yarn being of the yarn number count 20 and made of CONEX (an aromatic polyamide resin, trade mark of Teijin Limited). The basis weight of the foundation fabrics 1 is 100 g/m². Each of fibrous batts 2 is made of CONEX fibers of 2 to 5 deniers and has a basis weight of 125 g/m². A continuous web of fibrous batts 2 and a continuous sheet of foundation fabrics 1 are continually fed in a juxtaposed relation and then needle-punched together to cause fibers of both of the web and sheet to tangle together.

It was then allowed to travel in a circle while needle-punching the same. Five layers of the same fibrous web were then juxtaposed one after one on the outer surface of the circular felt while needle-punching the same. The outer and inner surfaces of the circular felt were then reversed. Another five layers of the same fibrous web were juxtaposed one after one on the outer surface of the felt, while needle-punching the same. Thus, a felt of a basis weight of 2,200 g/m² and thickness of 7.0 mm was produced. Then, this felt was heat-treated at 280° C. while stretching the same and, upon cutting the circular felt open into a flat shape, a multi-layered, needle-punched felt-like cushioning material was resulted. The cushioning material has a hardness of 40° (expressed in accordance with the Japanese Industrial Standard), a thickness of 7.0 mm and an apparent density of 0.31 g/cm³. The cushioning material was continually pressed for 40 minutes under hot-pressing conditions of a temperature of 180° C. and pressure of 100 kg/cm² and then allowed to cool for 20 minutes. The material was pressed repeatedly 50 times. Its thickness became 53.5% of the initial thickness thereof. This figure is 10% higher than that of a conventional cushioning material (a needle-punched cushioning material containing a sheet of foundation fabric and having the same basis weight as the cushioning material prepared in the above).

EXAMPLE 2

As fibers forming the fibrous batts, was employed heat-shrinkable CONEX fibers. Foundation fabrics were the same as those used in Example 1. By following the same method as described in Example 1, was obtained a felt which contains five layers of the foundation fabrics and has a basis weight of 2,200 g/m² and a thickness of 7.0 mm. The felt was subjected to a heat treatment at 280° C. while stretching the same. Was prepared a multi-layered, needle-punched, felt-like cushioning material of 5.2 mm thick and having an apparent density of 0.429 g/cm³ and a hardness of 50°.

The above cushioning material was used under the same hot-pressing operations as in Example 1. At the end of the hot-pressing operation, it still retained a thickness equivalent to 66.0% of its initial thickness. This figure is 36% higher than that of the conventional cushioning material used as a comparative example in Example 1 and, 24% higher compared with that of the cushioning material obtained in Example 1.

EXAMPLE 3

As the foundation fabrics, were employed bonded fabrics whose warp and weft yarns were made of polyester multi-filaments. Polyester fibers were used to form the fibrous batts. By following the same procedure as described in Example 1 and repeating the same six times, was obtained a felt which contained six layers of the foundation fabrics and has a basis weight of 4,200 g/m² and a thickness of 9.5 mm. The above felt was then subjected to a heat treatment step at 230° C. while stretching the same. A multi-layered, needle-punched, felt-like cushioning material was resulted. It has a hardness of 60°, thickness of 9.5 mm and an apparent density of 0.44 g/cm³. The cushioning material showed excellent compression resistant, anti-bending, cushioning and dimensional stability properties.

EXAMPLE 4

The foundation fabrics and fibrous batts were the same as those employed in Example 1. By following the procedure of Example 1 and repeating the same eight times, was prepared a felt which contained eight layers of the foundation fabrics and has a basis weight of 4,500 g/m² and a thickness of 10.0 mm. The upper-most layer of the foundation fabric (the eighth layer) was shortened by 50 mm from each of the both ends thereof.

The above felt was then subjected to a heat treatment at 280° C. while stretching the same. A multi-layered, needle-punched, felt-like cushioning material was obtained. Both end portions of the cushioning material are 8% smaller in density than the remaining central portion thereof.

The above cushioning material was used under hot-pressing conditions of 180° C. and 150 kg/cm². The cushioning material did not cause any uneven pressure even after 200 times of pressing operations while such an uneven pressure occurred conventionally along the periphery, particularly, at both end portions of a heating plate after 4 to 10 pressing operations.

We claim:

1. A method for producing a multi-layered, needle-punched, felt-like cushioning material having a plurality of fibrous batts and a plurality of foundation fabrics, said process comprising:
   (a) feeding a fibrous batt web and a sheet of foundation fabric to a needling apparatus to needle said fabric to one face of said fibrous batt;
   (b) reintroducing the leading end of the needled fabric into the needling apparatus to needle said needled fabric to said fabric and said fibrous batt and thereby causing said needled fabric to travel in a circle;
   (c) continuing to rotate said circled fabric through said needle apparatus until a circular felt of alternating layers of at least three fibrous batts and at least three foundation fabrics is obtained;
   (d) superimposing a single fibrous web onto the outer surface of said circular felt and rotating said circular felt and superimposed fabric through said needle apparatus until a predetermined number of outer layers of the same single fibrous web have been needled to said circular felt;
   (e) turning said circular felt inside out and repeating step (d);
   (f) heating the felt to heat-set the fibers of said batts and fabrics; and,
   (g) severing open said circular felt to form said cushioning material.

2. The method of claim 1 wherein the width of said sheet of foundation fabric is narrower than the width of said fibrous batt, whereby the density of the edge portions of said cushioning material is rendered less than the density of the remaining central portion.

3. The method of claim 1 further comprising stretching said felt and wherein said stretched felt is heated at a temperature of 200° to 300° C. to heat-set the fibers.

4. The method according to claim 1, wherein said foundation fabric is a bonded fabric produced by alternately juxtaposing warp and weft yarns and adhering the same at the cross-points thereof.

5. The cushioning material produced in accordance with the method of claim 2.

* * * * *